No. 769,896. PATENTED SEPT. 13, 1904.
J. GAPP.
COUPLING.
APPLICATION FILED JUNE 9, 1904.
NO MODEL.

Witnesses
E. F. Stewart
D. S. Dinore

John Gapp,
Inventor.
by C. A. Snow & Co.
Attorneys

No. 769,896. Patented September 13, 1904.

UNITED STATES PATENT OFFICE.

JOHN GAPP, OF SCRANTON, PENNSYLVANIA.

COUPLING.

SPECIFICATION forming part of Letters Patent No. 769,896, dated September 13, 1904.

Application filed June 9, 1904. Serial No. 211,861. (No model.)

*To all whom it may concern:*

Be it known that I, JOHN GAPP, a citizen of the United States, residing at Scranton, in the county of Lackawanna and State of Pennsylvania, have invented a new and useful Coupling, of which the following is a specification.

In certain classes of devices—such, for example, as the injectors of steam-boilers—it is necessary or desirable to employ copper pipes, and in making connection between this class of pipes it has been customary heretofore to braze thereon coupling-nipples. This mode of connection is objectionable to the extent that the nipples when brazed onto the pipes eventually become disunited therefrom or the pipes fracture at the brazed points.

My invention has for its objects to provide a comparatively simple inexpensive pipe-coupling designed especially for connecting copper pipes and one wherein the above-noted objectionable features are obviated.

To these ends the invention comprises the novel features of construction and combination of parts more fully hereinafter described.

Figure 1:
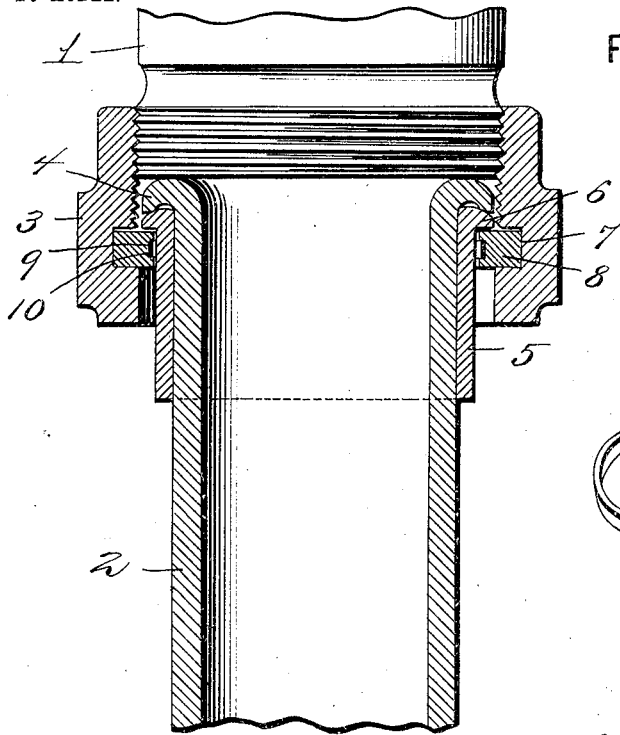
Figure 4:
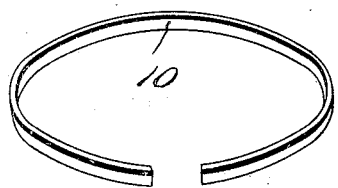
Figure 3:
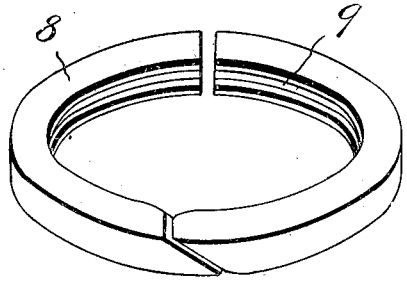
Figure 2:
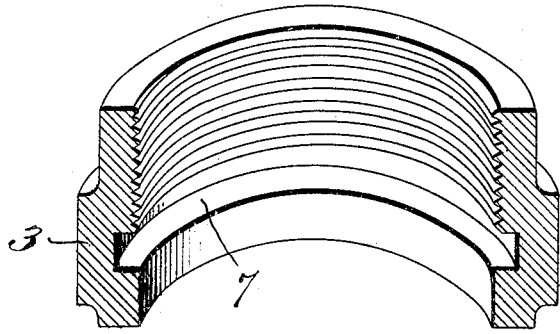

In the accompanying drawings, Figure 1 is a sectional view of a pipe-coupling constructed in accordance with my invention. Fig. 2 is a detail view of the coupling-nut. Fig. 3 is a view of the guide-ring. Fig. 4 is a view of the retaining-spring.

Referring to the drawings, 1 designates a portion of an injector check-valve, which is conventionally shown herein and may be of the usual or any appropriate construction, and 2 a pipe coupled thereto by means of a nut 3.

The pipe 2, in accordance with my invention, has formed on its end a retaining member or bead 4, designed for engagement by a coupling nipple or thimble 5, formed to fit upon the outer surface of and embrace the pipe, the thimble being in turn provided at one end with a peripheral bead or flange 6, adapted to bear against the bead 4 to prevent escape of the thimble from the pipe. The bead 6 serves the further function of a coupling-head for engagement by the coupling-nut 3. The nut 3 is provided with an internal groove 7, designed to receive a guide-ring 8, formed in two sections, and in turn provided with an internal groove or recess 9, adapted to receive a split spring clamping-ring 10, which serves to maintain the guide-ring 8 in position within the nut.

In practice when it is desired to connect the pipe 2 with an element such, for example, as the injector-check 1 the nipple 5 is seated in position on the pipe to bear against the retaining-bead 4, and the end of the pipe and nipple are then inserted in the nut 3, into which the ring 8 and retaining-spring 10 have been previously seated. The nut 3 is then coupled in the usual manner with the element 1, which is externally threaded for engagement by similar internal threads on the nut.

It is apparent from this construction that the nipple 5 will be securely retained upon the pipe 2 and this without brazing, whereby the cost of construction is materially reduced and liability of the parts becoming disunited or fractured is obviated.

In attaining these ends it is to be understood that I do not limit myself to the precise details herein set forth, inasmuch as minor changes therein may be resorted to without departing from the spirit of the invention. For example, the guide-ring 8, herein shown and described as being in two sections, may of course be composed of two or more sections within the scope of the invention.

Having thus described the invention, what I claim is—

1. The combination with a pair of elements, one having a coupling-head, a coupling member for connecting said elements and designed for engagement with the head, a guide-ring seated within the member, and a retaining-spring for holding the ring in place.

2. The combination with a pair of elements, of a coupling member for connecting the same, said member having an internal groove, a sectional guide-ring seated in the groove and provided with an internal seat, and an annulus disposed in the seat for retaining the ring-sections in position.

In testimony that I claim the foregoing as my own I have hereto affixed my signature in the presence of two witnesses.

JOHN GAPP.

Witnesses:
  CHAS. JACOBS,
  M. McMURRAY.